(12) United States Patent
Chen

(10) Patent No.: US 8,822,014 B2
(45) Date of Patent: Sep. 2, 2014

(54) GLUE-FREE ANTI-SLIP POLYVINYL CHLORIDE FLOOR BRICK AND PREPARING METHOD THEREOF

(75) Inventor: Pen-Yuan Chen, Dongguan (CN)

(73) Assignee: Dongguan Meijer Plastic Products Co., Ltd., Dongguan, Guangdong Province (CN)

(*) Notice: Subject to any disclaimer, the term of this patent is extended or adjusted under 35 U.S.C. 154(b) by 403 days.

(21) Appl. No.: 13/412,087

(22) Filed: Mar. 5, 2012

(65) Prior Publication Data

US 2013/0230687 A1 Sep. 5, 2013

(51) Int. Cl.
*B32B 3/00* (2006.01)
*B44C 3/08* (2006.01)
*B44C 5/04* (2006.01)
*B31F 1/07* (2006.01)

(52) U.S. Cl.
USPC ........... 428/156; 428/172; 156/196; 156/219; 156/221

(58) Field of Classification Search
USPC ............ 428/156, 172, 187; 156/60, 196, 206, 156/209, 219, 220, 221
See application file for complete search history.

(56) References Cited

U.S. PATENT DOCUMENTS 8,156,710 B1 * 4/2012 Pien .............................. 52/788.1

* cited by examiner

*Primary Examiner* — Catherine A Simone

(57) ABSTRACT

The present invention discloses a glue-free anti-slip polyvinyl chloride floor brick which includes a polyvinyl chloride anti-slip layer having a bottom surface formed with a flexible thermal-pressed pattern by thermal pressing. The thermal-pressed pattern includes a plurality of continuously and repetitively connected, closed and non-equilateral hexagonal protruded ribs, which are characterized with a required flexibility by utilizing a special ingredient amount of the anti-slip layer and provided with an anti-slip coefficient of 1.5 by incorporating with non-equilateral hexagonal anti-slip patterns with special sizes and shapes, thereby enhancing the slip resistance of the floor brick to overcome the bottlenecks in plastic floor brick industries.

2 Claims, 4 Drawing Sheets

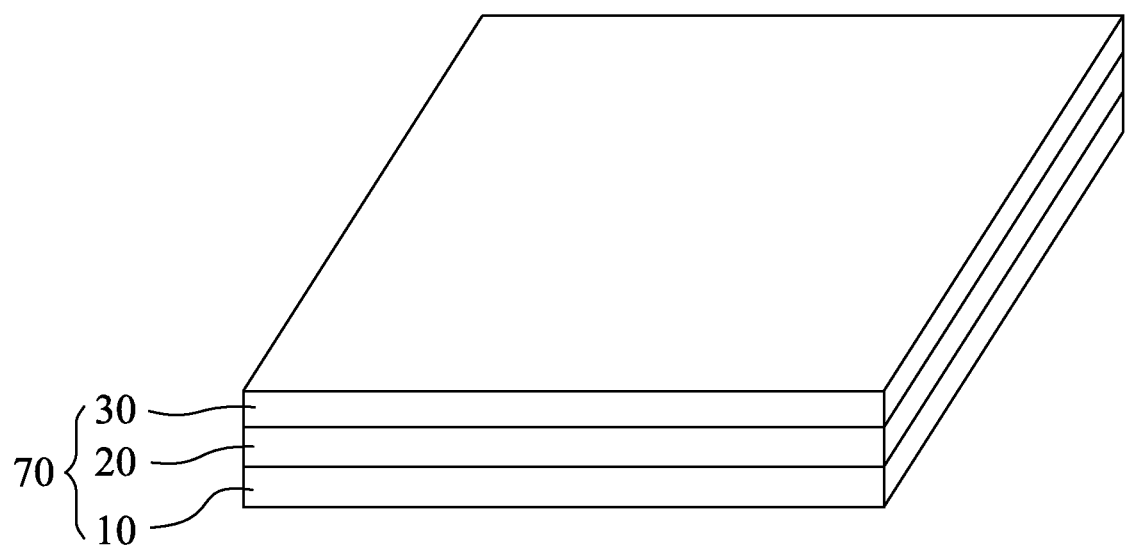
F I G. 1

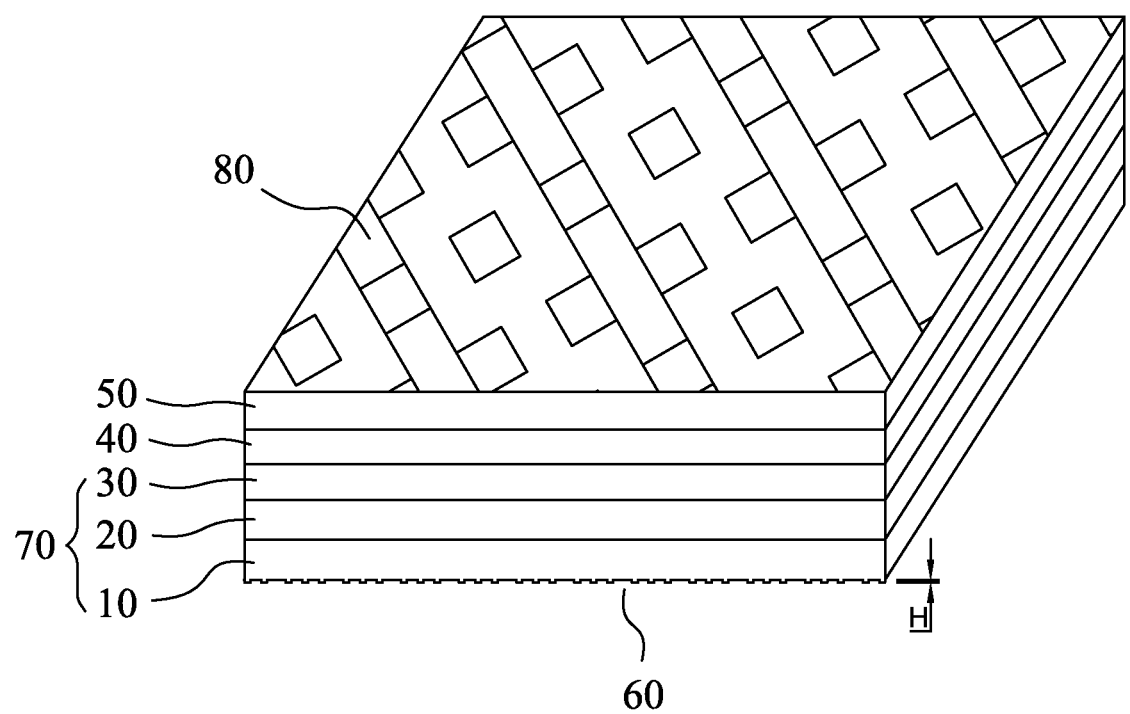
F I G. 2 ns of the present invention is to provide a glue-free anti-slip polyvinyl chloride floor brick and a preparing method thereof, capable of being characterized with excellent anti-slip property.

GLUE-FREE ANTI-SLIP POLYVINYL CHLORIDE FLOOR BRICK AND PREPARING METHOD THEREOF

BACKGROUND OF THE INVENTION

1. Field of the Invention

The present invention relates to techniques in plastic floor field, in particular relates to a glue-free anti-slip polyvinyl chloride floor brick provided with high anti-slip coefficient and a preparing method thereof.

2. Description of the Related Art

As everybody knows, a floor cover material, generally made of high molecular compound (mainly composed of resin) and referred to a plastic floor, includes the following characteristics. Firstly, the plastic floor is relatively cheaper, compared to carpets, wood floorings, stone materials and ceramic floor materials. The plastic floor has excellent decoration effects based on a variety of types, designs, patterns, colors, textures and shapes thereof and high density special structures capable of satisfying the requirements of different users, such as realistically simulated natural material of lines of wood, marbling, carpet and granite. Further, the plastic floor is characterized with multiple functions such as comfortable feet feel, warm feel, heat isolation, acoustic isolation and damp proof. Because cement and sand or going in for large-scale construction are not needed, the plastic floor can be conveniently and rapidly built and laid by dedicated paste, and a user is further allowed to be involved in design, material selection and construction processes. In weight comparison, the light plastic floor is generally one-tenth of the wood floor, one twentieth of the ceramic tile floor, and one-twenty fifth of the stone material, so that the light plastic floor can be easily moved and constructed than the wood floor, the ceramic tile floor and the stone material, preferably suitable for at least three-story building and office constructions and capable of reducing the supported weight of the buildings and providing safety. Moreover, the plastic floor having excellent wear resistance and long life span is capable of being conveniently cleaned, washed and dried. Therefore, based on the features and advantages of the plastic floor, it is understood the plastic floor is suitably applied to the related markets.

Research developments on slip resistance of the plastic floors are constantly studied in the related fields. In the performance of the plastic floor, the slip resistance is referred to the anti-slip property of the plastic floor, and the anti-slip coefficient is an important factor to determine the slip resistance of the plastic floor. At present, an anti-slip pattern formed of regular hexagon, circle or wave-shape is disclosed to be disposed on a bottom surface of the plastic floor which is utilized to contact a ground surface. It is known that the anti-slip coefficient of the conventional plastic floor is at most 1.1, and the improper design and combination of these patterns still cannot advancedly increase the anti-slip coefficient of the plastic floor.

BRIEF SUMMARY OF THE INVENTION

In view of this, the main purpose of the present invention is to provide a glue-free anti-slip polyvinyl chloride floor brick and a preparing method thereof, capable of being characterized with excellent anti-slip property.

For realizing the purposes above, the present invention adopts the following technical projects.

A circular-type glue-free anti-slip polyvinyl chloride floor brick includes a polyvinyl chloride anti-slip layer, a polyvinyl chloride bottom material layer, a polyvinyl chloride middle material layer, a polyvinyl chloride printed layer and a polyvinyl chloride wear-resistant layer which are bottom-up sequentially stacked and combined by thermal pressing. The polyvinyl chloride anti-slip layer includes a bottom surface utilized to contact a ground surface and formed with a flexible thermal-pressed pattern by thermal pressing. The thermal-pressed pattern includes a plurality of continuously and repetitively connected, closed and non-equilateral hexagonal protruded ribs circumferentially formed as a closed concave-chambered sucking disk.

A material ingredient of the polyvinyl chloride anti-slip layer measured by weight includes degree of polymerization of 1000 of polyvinyl chloride from 58.5% to 63.5%, plasticizer from 34.9% to 39%, stabilizer from 0.95% to 2.1%, color powder from 0.5% to 0.69% and 800 mesh calcium carbonate from 0.06% to 0.08%, which are amounted to 100%.

Further, the non-equilateral hexagonal protruded rib has a shape circumferentially formed by two isometric and parallel positive short sides and two pairs of two parallel slanted long sides wherein the length of each positive short side is ranged from 4 mm to 8 mm, the length of each slanted long side is ranged from 5 mm to 9 mm, the length of the slanted long side is absolutely greater than that of the positive short side, and the positive short side and the slanted long side have same width of 1 mm and same height ranged from 0.25 mm to 0.35 mm.

A method for preparing the glue-free anti-slip polyvinyl chloride floor brick includes the steps of:

providing a combination processing of a first thermal-pressing by bottom-up sequentially stacking the polyvinyl chloride anti-slip layer, the polyvinyl chloride bottom material layer and the polyvinyl chloride middle material layer to thermally press and laminate into a supporting body, wherein a heating temperature of 130 Celsius for 24 minutes is provided in a sectionally-pressurized type thermal pressing process which includes a first sectional pressurization of 50-60 kgf/cm2 from 24 to 27 minutes, a second sectional pressurization of 60-80 kgf/cm2 from 1 to 3 minutes, and a third sectional pressurization of 110-130 kgf/cm2 from 15 to 20 minutes; and providing a second thermal-pressing pattern processing by bottom-up sequentially stacking the polyvinyl chloride wear-resistant layer and the polyvinyl chloride printed layer on the supporting body for thermal pressing, wherein a heating temperature of 130 Celsius for 24 minutes is provided in a sectionally-pressurized type thermal pressing process which includes a first sectional pressurization of 50-60 kgf/cm2 from 24 to 27 minutes, a second sectional pressurization of 65-95 kgf/cm2 from 1 to 3 minutes, and a third sectional pressurization of 110-140 kgf/cm2 from 20 to 24 minutes; in the thermal pressing process, the polyvinyl chloride wear-resistant layer is combined with the polyvinyl chloride printed layer, the polyvinyl chloride printed layer is combined with the polyvinyl chloride middle material layer of the supporting body, and the bottom surface of the polyvinyl chloride anti-slip layer and a top surface of the polyvinyl chloride wear-resistant layer are simultaneously formed with patterns by thermal pressing, wherein the thermally-pressed pattern formed on the bottom surface of the polyvinyl chloride anti-slip layer includes a plurality of continuously and repetitively connected, closed and non-equilateral hexagonal protruded ribs; the non-equilateral hexagonal protruded ribs has a shape circumferentially formed by two isometric and parallel positive short sides and two pairs of two parallel slanted long sides wherein the length of each positive short side is ranged from 4 mm to 8 mm, the length of each slanted long side is ranged from 5 mm to 9 mm, the length of the slanted long side is greater than that of the positive short side, and the positive short side and the slanted long side have same width of 1 mm and same height ranged from 0.25 mm to 0.35 mm.

After extensive and intension researches and several tests, the applicant renders that the anti-slip property of the plastic floor is determined by the combination of the multiple factors such as flexibility of the anti-slip layer and the shape design of the non-slip patterns, and a high anti-slip coefficient can be obtained when the flexibility of the anti-slip layer and the shape design of the non-slip patterns are optimistically combined. The technical projects of the present invention can have a required flexibility by utilizing a special ingredient amount of the anti-slip layer and provide an anti-slip coefficient of 1.5 (proving 36% increment greater than the anti-slip coefficient of 1.1 of the conventional plastic floor brick) by incorporating with non-equilateral hexagonal anti-slip patterns with special sizes and shapes, thereby enhancing the anti-slip property of the floor brick to overcome the bottlenecks of plastic floor brick. Further, the glue-free anti-slip polyvinyl chloride floor brick of the present invention still can have excellent anti-slip property on wetted or damped ground surfaces, particularly suitable for the bathroom and balcony. Besides, the glue-free anti-slip polyvinyl chloride floor brick of the present invention is conveniently assembled and disassembled, capable of providing hard-going effect in wetted or damped area and enhanced anti-slip effect to assure the safety of the elder and children.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 is a schematic view showing a three-dimensional structure of a supporting body of an embodiment of the present invention after a combination processing of a first thermal-pressing is fulfilled;

FIG. 2 is a schematic view showing a product of an embodiment of the present invention after a second thermal pressing is fulfilled;

DETAILED DESCRIPTION OF THE INVENTION

First Embodiment

Figure 3:
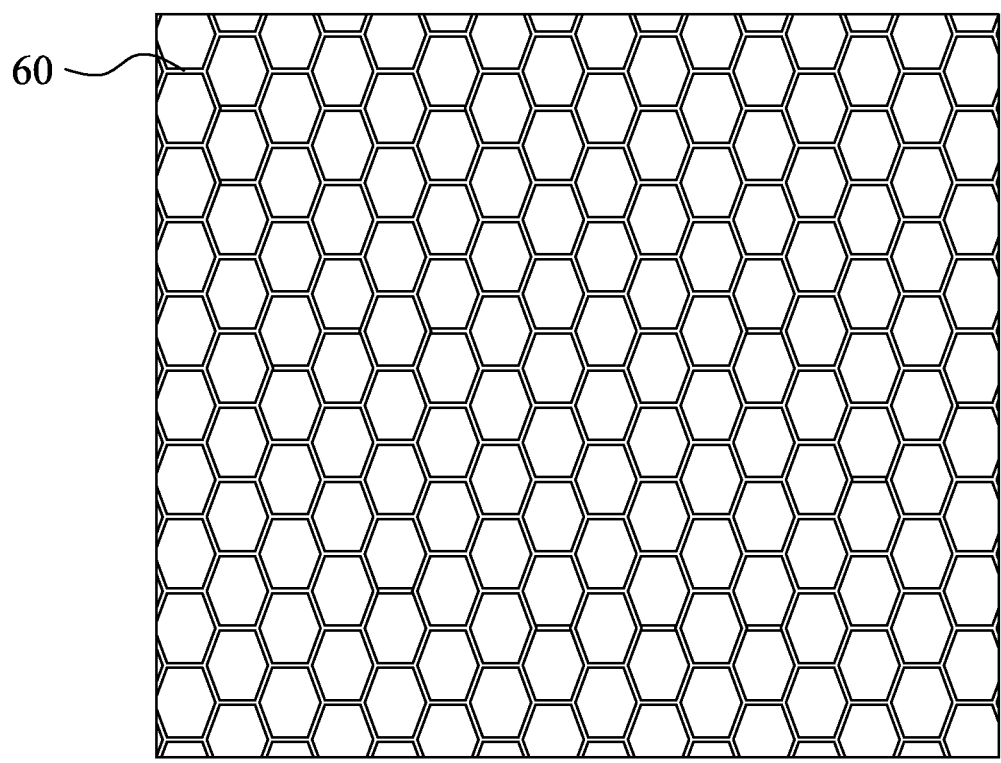
FIG. 3 is an enlarged schematic view showing a bottom surface of an anti-slip layer of an embodiment of the present invention.

A method for preparing an anti-slip polyvinyl chloride (PVC) floor brick comprises the following steps.

Firstly, as shown in FIG. 1, in a combination processing of a first thermal-pressing, a polyvinyl chloride anti-slip layer 10, a polyvinyl chloride bottom material layer 20 and a polyvinyl chloride middle material layer 30 are bottom-up sequentially stacked to thermally press and laminate into a supporting body 70. A heating temperature of 130 Celsius for 24 minutes is provided in a sectionally-pressurized type thermal pressing process, and pressurized parameters are physically shown in Table A1.

TABLE A1

| Unit | Stage | First sectional pressurization | Second sectional pressurization | Third sectional pressurization |
|---|---|---|---|---|
| Parameter | Pressure | 50 kgf/cm$^2$ | 80 kgf/cm$^2$ | 110 kgf/cm$^2$ |
| | Time | 24 min | 3 min | 20 min |

A material ingredient of the polyvinyl chloride anti-slip layer measured by weight includes degree of polymerization of 1000 of polyvinyl chloride of 58.5%, plasticizer of 38.8%, stabilizer of 2.1%, color powder 0.52% and 800 mesh calcium carbonate of 0.08%, which are amounted to 100%.

Secondly, as shown in FIG. 2, in a second thermal-pressing pattern processing, a polyvinyl chloride wear-resistant layer 50 and a polyvinyl chloride printed layer 40 are bottom-up sequentially stacked on the supporting body 70 for thermal pressing, wherein a heating temperature of 118 degrees of Celsius for 24 minutes is provided in a sectionally-pressurized type thermal pressing process, and pressurized parameters are physically shown in Table B1.

TABLE B1

| Unit | Stage | First sectional pressurization | Second sectional pressurization | Third sectional pressurization |
|---|---|---|---|---|
| Parameter | Pressure | 50 kgf/cm$^2$ | 95 kgf/cm$^2$ | 140 kgf/cm$^2$ |
| | Time | 29 min | 3 min | 24 min |

In the thermal pressing process, the polyvinyl chloride wear-resistant layer 50 is combined with the polyvinyl chloride printed layer 40, the polyvinyl chloride printed layer 40 is combined with the polyvinyl chloride middle material layer 30 of the supporting body 70, and the bottom surface of the polyvinyl chloride anti-slip layer 10 and a top surface of the polyvinyl chloride wear-resistant layer 50 are simultaneously formed with patterns 60 and 80 by thermal pressing, respectively.

Figure 4:
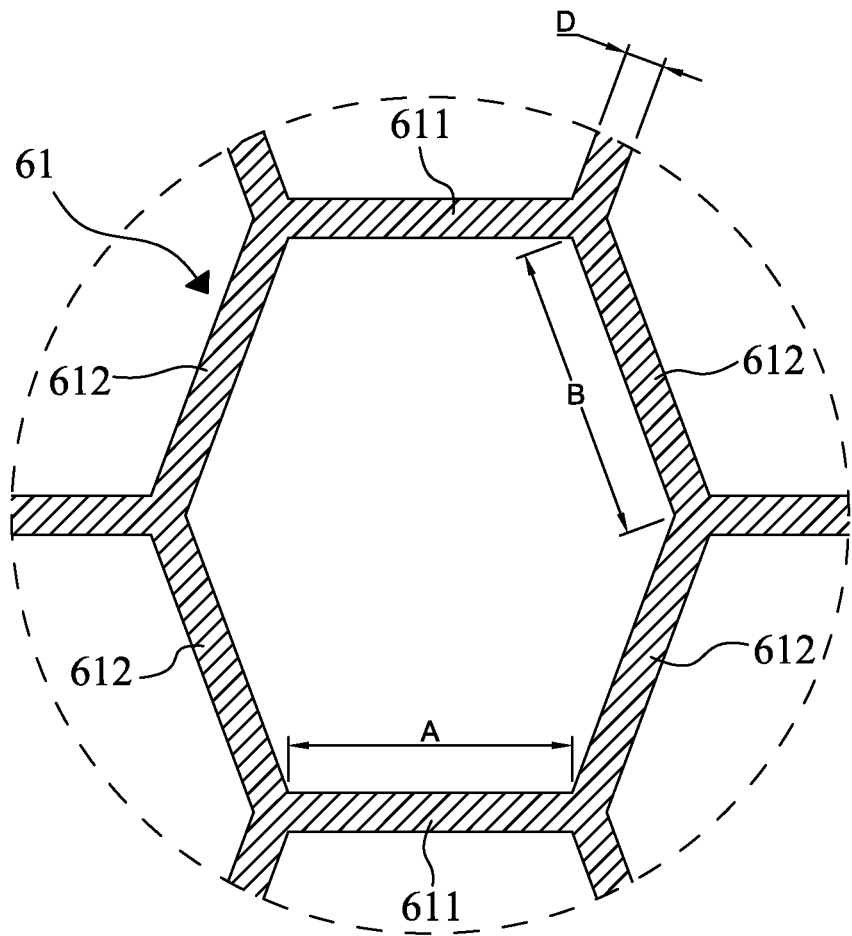
FIG. 4 is a partially enlarged schematic view showing thermally-pressed pattern of an embodiment of the present invention.

Referring to FIGS. 3 and 4, the thermally-pressed pattern 60 formed on the bottom surface of the polyvinyl chloride anti-slip layer 10 includes a plurality of continuously and repetitively connected, flexible, closed and non-equilateral hexagonal protruded ribs 61 which are circumferentially formed as a closed concave-chambered sucking disk.

The non-equilateral hexagonal protruded rib has a shape circumferentially formed by two isometric and parallel positive short sides 611 and two pairs of two parallel slanted long sides 612 wherein the length 'A' of each positive short side 611 is 4 mm, the length of each slanted long side 612 is 5 mm, the positive short side 611 and the slanted long side 612 have same width 'D' of 1 mm and same height 'H' of 0.25 mm.

The slip resistance of the anti-slip PVC floor brick formed by the second thermal-pressing pattern processing is tested on a horizontal platform by a frictional coefficient tester, wherein a tension gauge meter has an indicated value ranged from zero to 1 kg and an accuracy of 0.01 kg. Before using, the value of the tension gauge meter is reset and a to-be-tested object is properly placed. When a weighted counterweight block and a floor brick product adhesively combined to each other are placed on the platform, a power supply is turned on to slide a direction control switch moving from back to front along a guide rail at a constant speed. The experiment of reading a maximum indicated value of the tension gauge meter and sliding the direction control switch for inverse movement is repeated three times for obtaining an average value, and the frictional coefficient can be obtained by dividing the average value with a force for moving the weigh of the counterweight block and the floor brick product. Thus, the tested anti-slip coefficient obtained from the frictional coefficient tester is 1.52.

Second Embodiment

A method for preparing an anti-slip PVC floor brick comprises the following steps.

Firstly, as shown in FIG. 1, in a combination processing of a first thermal-pressing, a polyvinyl chloride anti-slip layer 10, a polyvinyl chloride bottom material layer 20 and a polyvinyl chloride middle material layer 30 are bottom-up sequentially stacked to thermally press and laminate into a supporting body 70. A heating temperature of 130 degrees of Celsius for 24 minutes is provided in a sectionally-pressurized type thermal pressing process, and pressurized parameters are physically shown in Table A2.

TABLE A2

| Unit | Stage | First sectional pressurization | Second sectional pressurization | Third sectional pressurization |
|---|---|---|---|---|
| Parameter | Pressure | 60 kgf/cm$^2$ | 60 kgf/cm$^2$ | 110 kgf/cm$^2$ |
| | Time | 24 min | 1 min | 15 min |

A material ingredient of the polyvinyl chloride anti-slip layer measured by weight includes degree of polymerization of 1000 of polyvinyl chloride of 63.5%, plasticizer of 34.9%, stabilizer of 1.0%, color powder 0.54% and 800 mesh calcium carbonate of 0.06%, which are amounted to 100%.

Secondly, as shown in FIG. 2, in a second thermal-pressing pattern processing, a polyvinyl chloride wear-resistant layer 50 and a polyvinyl chloride printed layer 40 are bottom-up sequentially stacked on the supporting body 70 for thermal pressing, wherein a heating temperature of 118 degrees of Celsius for 24 minutes is provided in a sectionally-pressurized type thermal pressing process, and pressurized parameters are physically shown in Table B2.

TABLE B2

| Unit | Stage | First sectional pressurization | Second sectional pressurization | Third sectional pressurization |
|---|---|---|---|---|
| Parameter | Pressure | 50 kgf/cm$^2$ | 95 kgf/cm$^2$ | 140 kgf/cm$^2$ |
| | Time | 29 min | 3 min | 24 min |

In the thermal pressing process, the polyvinyl chloride wear-resistant layer 50 is combined with the polyvinyl chloride printed layer 40, the polyvinyl chloride printed layer 40 is combined with the polyvinyl chloride middle material layer 30 of the supporting body 70, and the bottom surface of the polyvinyl chloride anti-slip layer 10 and a top surface of the polyvinyl chloride wear-resistant layer 50 are simultaneously formed with patterns 60 and 80 by thermal pressing, respectively.

Referring to FIGS. 3 and 4, the thermally-pressed pattern 60 formed on the bottom surface of the polyvinyl chloride anti-slip layer 10 includes a plurality of continuously and repetitively connected, flexible, closed and non-equilateral hexagonal protruded ribs 61 which are circumferentially formed as a closed concave-chambered sucking disk.

The non-equilateral hexagonal protruded rib has a shape circumferentially formed by two isometric and parallel positive short sides 611 and two pairs of two parallel slanted long sides 612 wherein the length 'A' of each positive short side 611 is 4 mm, the length of each slanted long side 612 is 5 mm, the positive short side 611 and the slanted long side 612 have same width 'D' of 1 mm and same height 'H' of 0.35 mm.

The slip resistance of the anti-slip PVC floor brick formed by the second thermal-pressing pattern processing is tested by the frictional coefficient tester and the testing method, and the tested anti-slip coefficient obtained therefrom is 1.55.

Third Embodiment

A method for preparing an anti-slip PVC floor brick comprises the following steps.

Firstly, as shown in FIG. 1, in a combination processing of a first thermal-pressing, a polyvinyl chloride anti-slip layer 10, a polyvinyl chloride bottom material layer 20 and a polyvinyl chloride middle material layer 30 are bottom-up sequentially stacked to thermally press and laminate into a supporting body 70. A heating temperature of 130 degrees of Celsius for 24 minutes is provided in a sectionally-pressurized type thermal pressing process, and pressurized parameters are physically shown in Table A3.

TABLE A3

| Unit | Stage | First sectional pressurization | Second sectional pressurization | Third sectional pressurization |
|---|---|---|---|---|
| Parameter | Pressure | 55 kgf/cm$^2$ | 70 kgf/cm$^2$ | 120 kgf/cm$^2$ |
| | Time | 25 min | 2 min | 16 min |

A material ingredient of the polyvinyl chloride anti-slip layer measured by weight includes degree of polymerization of 1000 of polyvinyl chloride of 61.5%, plasticizer of 36.5%, stabilizer of 1.3%, color powder 0.64% and 800 mesh calcium carbonate of 0.06%, which are amounted to 100%.

Secondly, as shown in FIG. 2, in a second thermal-pressing pattern processing, a polyvinyl chloride wear-resistant layer 50 and a polyvinyl chloride printed layer 40 are bottom-up sequentially stacked on the supporting body 70 for thermal pressing, wherein a heating temperature of 118 degrees of Celsius for 24 minutes is provided in a sectionally-pressurized type thermal pressing process, and pressurized parameters are physically shown in Table B3.

TABLE B3

| Unit | Stage | First sectional pressurization | Second sectional pressurization | Third sectional pressurization |
|---|---|---|---|---|
| Parameter | Pressure | 60 kgf/cm$^2$ | 95 kgf/cm$^2$ | 140 kgf/cm$^2$ |
| | Time | 29 min | 1 min | 24 min |

In the thermal pressing process, the polyvinyl chloride wear-resistant layer 50 is combined with the polyvinyl chloride printed layer 40, the polyvinyl chloride printed layer 40 is combined with the polyvinyl chloride middle material layer 30 of the supporting body 70, and the bottom surface of the polyvinyl chloride anti-slip layer 10 and a top surface of the polyvinyl chloride wear-resistant layer 50 are simultaneously formed with patterns 60 and 80 by thermal pressing, respectively.

Referring to FIGS. 3 and 4, the thermally-pressed pattern 60 formed on the bottom surface of the polyvinyl chloride anti-slip layer 10 includes a plurality of continuously and repetitively connected, flexible, closed and non-equilateral hexagonal protruded ribs 61 which are circumferentially formed as a closed concave-chambered sucking disk.

The non-equilateral hexagonal protruded rib has a shape circumferentially formed by two isometric and parallel positive short sides 611 and two pairs of two parallel slanted long sides 612 wherein the length 'A' of each positive short side 611 is 4 mm, the length of each slanted long side 612 is 5 mm, the positive short side 611 and the slanted long side 612 have same width 'D' of 1 mm and same height 'H' of 0.30 mm.

The slip resistance of the anti-slip PVC floor brick formed by the second thermal-pressing pattern processing is tested by the frictional coefficient tester and the testing method, and the tested anti-slip coefficient obtained therefrom is 1.50.

Fourth Embodiment

A method for preparing an anti-slip PVC floor brick comprises the following steps.

Firstly, as shown in FIG. 1, in a combination processing of a first thermal-pressing, a polyvinyl chloride anti-slip layer 10, a polyvinyl chloride bottom material layer 20 and a polyvinyl chloride middle material layer 30 are bottom-up sequentially stacked to thermally press and laminate into a supporting body 70. A heating temperature of 130 degrees of Celsius for 24 minutes is provided in a sectionally-pressurized type thermal pressing process, and pressurized parameters are physically shown in Table A4.

TABLE A4

| Unit | Stage | First sectional pressurization | Second sectional pressurization | Third sectional pressurization |
|---|---|---|---|---|
| Parameter | Pressure | 52 kgf/cm² | 62 kgf/cm² | 110 kgf/cm² |
| | Time | 25 min | 2 min | 20 min |

A material ingredient of the polyvinyl chloride anti-slip layer measured by weight includes degree of polymerization of 1000 of polyvinyl chloride of 62.3%, plasticizer of 35.2%, stabilizer of 1.8%, color powder 0.62% and 800 mesh calcium carbonate of 0.08%, which are amounted to 100%.

Secondly, as shown in FIG. 2, in a second thermal-pressing pattern processing, a polyvinyl chloride wear-resistant layer 50 and a polyvinyl chloride printed layer 40 are bottom-up sequentially stacked on the supporting body 70 for thermal pressing, wherein a heating temperature of 118 degrees of Celsius for 24 minutes is provided in a sectionally-pressurized type thermal pressing process, and pressurized parameters are physically shown in Table B4.

TABLE B4

| Unit | Stage | First sectional pressurization | Second sectional pressurization | Third sectional pressurization |
|---|---|---|---|---|
| Parameter | Pressure | 50 kgf/cm² | 94 kgf/cm² | 140 kgf/cm² |
| | Time | 28 min | 3 min | 23 min |

In the thermal pressing process, the polyvinyl chloride wear-resistant layer 50 is combined with the polyvinyl chloride printed layer 40, the polyvinyl chloride printed layer 40 is combined with the polyvinyl chloride middle material layer 30 of the supporting body 70, and the bottom surface of the polyvinyl chloride anti-slip layer 10 and a top surface of the polyvinyl chloride wear-resistant layer 50 are simultaneously formed with patterns 60 and 80 by thermal pressing, respectively.

Referring to FIGS. 3 and 4, the thermally-pressed pattern 60 formed on the bottom surface of the polyvinyl chloride anti-slip layer 10 includes a plurality of continuously and repetitively connected, flexible, closed and non-equilateral hexagonal protruded ribs 61 which are circumferentially formed as a closed concave-chambered sucking disk.

The non-equilateral hexagonal protruded rib has a shape circumferentially formed by two isometric and parallel positive short sides 611 and two pairs of two parallel slanted long sides 612 wherein the length 'A' of each positive short side 611 is 4 mm, the length of each slanted long side 612 is 5 mm, the positive short side 611 and the slanted long side 612 have same width 'D' of 1 mm and same height 'H' of 0.25 mm.

The slip resistance of the anti-slip PVC floor brick formed by the second thermal-pressing pattern processing is tested by the frictional coefficient tester and the testing method, and the tested anti-slip coefficient obtained therefrom is 1.53.

Fifth Embodiment

A method for preparing an anti-slip PVC floor brick comprises the following steps.

Firstly, as shown in FIG. 1, in a combination processing of a first thermal-pressing, a polyvinyl chloride anti-slip layer 10, a polyvinyl chloride bottom material layer 20 and a polyvinyl chloride middle material layer 30 are bottom-up sequentially stacked to thermally press and laminate into a supporting body 70. A heating temperature of 130 degrees of Celsius for 24 minutes is provided in a sectionally-pressurized type thermal pressing process, and pressurized parameters are physically shown in Table A5.

TABLE A5

| Unit | Stage | First sectional pressurization | Second sectional pressurization | Third sectional pressurization |
|---|---|---|---|---|
| Parameter | Pressure | 60 kgf/cm² | 80 kgf/cm² | 110 kgf/cm² |
| | Time | 27 min | 3 min | 15 min |

A material ingredient of the polyvinyl chloride anti-slip layer measured by weight includes degree of polymerization of 1000 of polyvinyl chloride of 59%, plasticizer of 39%, stabilizer of 1.25%, color powder 0.69% and 800 mesh calcium carbonate of 0.06%, which are amounted to 100%.

Secondly, as shown in FIG. 2, in a second thermal-pressing pattern processing, a polyvinyl chloride wear-resistant layer 50 and a polyvinyl chloride printed layer 40 are bottom-up sequentially stacked on the supporting body 70 for thermal pressing, wherein a heating temperature of 118 degrees of Celsius for 24 minutes is provided in a sectionally-pressurized type thermal pressing process, and pressurized parameters are physically shown in Table B5.

TABLE B5

| Unit | Stage | First sectional pressurization | Second sectional pressurization | Third sectional pressurization |
|---|---|---|---|---|
| Parameter | Pressure | 50 kgf/cm² | 80 kgf/cm² | 120 kgf/cm² |
| | Time | 29 min | 1 min | 22 min |

In the thermal pressing process, the polyvinyl chloride wear-resistant layer 50 is combined with the polyvinyl chloride printed layer 40, the polyvinyl chloride printed layer 40 is combined with the polyvinyl chloride middle material layer 30 of the supporting body 70, and the bottom surface of the polyvinyl chloride anti-slip layer 10 and a top surface of the polyvinyl chloride wear-resistant layer 50 are simultaneously formed with patterns 60 and 80 by thermal pressing, respectively.

Referring to FIGS. 3 and 4, the thermally-pressed pattern 60 formed on the bottom surface of the polyvinyl chloride anti-slip layer 10 includes a plurality of continuously and repetitively connected, flexible, closed and non-equilateral hexagonal protruded ribs 61 which are circumferentially formed as a closed concave-chambered sucking disk.

The non-equilateral hexagonal protruded rib has a shape circumferentially formed by two isometric and parallel positive short sides 611 and two pairs of two parallel slanted long sides 612 wherein the length 'A' of each positive short side 611 is 4 mm, the length of each slanted long side 612 is 5 mm, the positive short side 611 and the slanted long side 612 have same width 'D' of 1 mm and same height 'H' of 0.25 mm.

The slip resistance of the anti-slip PVC floor brick formed by the second thermal-pressing pattern processing is tested by the frictional coefficient tester and the testing method, and the tested anti-slip coefficient obtained therefrom is 1.51.

What is claimed is:

1. A glue-free anti-slip polyvinyl chloride floor brick, characterized in that the polyvinyl chloride floor brick comprises a polyvinyl chloride anti-slip layer, a polyvinyl chloride bottom material layer, a polyvinyl chloride middle material layer, a polyvinyl chloride printed layer and a polyvinyl chloride wear-resistant layer which are bottom-up sequentially stacked and combined by thermal pressing, the polyvinyl chloride anti-slip layer includes a bottom surface utilized to contact a ground surface and formed with a flexible thermal-pressed pattern by thermal pressing, the thermal-pressed pattern includes a plurality of continuously and repetitively connected, closed and non-equilateral hexagonal protruded ribs circumferentially formed as a closed concave-chambered sucking disk, wherein:
 a material ingredient of the polyvinyl chloride anti-slip layer measured by weight includes degree of polymerization of 1000 of polyvinyl chloride from 58.5% to 63.5%, plasticizer from 34.9% to 39%, stabilizer from 0.95% to 2.1%, color powder from 0.5% to 0.69% and 800 mesh calcium carbonate from 0.06% to 0.08%, which are amounted to 100%; and
 the non-equilateral hexagonal protruded rib has a shape circumferentially formed by two isometric and parallel positive short sides and two pairs of two parallel slanted long sides wherein the length of each positive short side is ranged from 4 mm to 8 mm, the length of each slanted long side is ranged from 5 mm to 9 mm, the length of the slanted long side is absolutely greater than that of the positive short side, and the positive short side and the slanted long side have same width of 1 mm and same height ranged from 0.25 mm to 0.35 mm.

2. A method for preparing the glue-free anti-slip polyvinyl chloride floor brick as claimed in claim 1, characterized in that the method comprises the steps of:
 providing a combination processing of a first thermal-pressing by bottom-up sequentially stacking the polyvinyl chloride anti-slip layer, the polyvinyl chloride bottom material layer and the polyvinyl chloride middle material layer to thermally press and laminate into a supporting body, wherein a heating temperature of 130 degrees of Celsius for 24 minutes is provided in a sectionally-pressurized type thermal pressing process which includes a first sectional pressurization of 50-60 kgf/cm$^2$ from 24 to 27 minutes, a second sectional pressurization of 60-80 kgf/cm$^2$ from 1 to 3 minutes, and a third sectional pressurization of 110-130 kgf/cm$^2$ from 15 to 20 minutes; and
 providing a second thermal-pressing pattern processing by bottom-up sequentially stacking the polyvinyl chloride wear-resistant layer and the polyvinyl chloride printed layer on the supporting body for thermal pressing, wherein a heating temperature of 130 degrees of Celsius for 24 minutes is provided in a sectionally-pressurized type thermal pressing process which includes a first sectional pressurization of 50-60 kgf/cm$^2$ from 24 to 27 minutes, a second sectional pressurization of 65-95 kgf/cm$^2$ from 1 to 3 minutes, and a third sectional pressurization of 110-140 kgf/cm$^2$ from 20 to 24 minutes; in the thermal pressing process, the polyvinyl chloride wear-resistant layer is combined with the polyvinyl chloride printed layer, the polyvinyl chloride printed layer is combined with the polyvinyl chloride middle material layer of the supporting body, and the bottom surface of the polyvinyl chloride anti-slip layer and a top surface of the polyvinyl chloride wear-resistant layer are simultaneously formed with patterns by thermal pressing, wherein the thermally-pressed pattern formed on the bottom surface of the polyvinyl chloride anti-slip layer comprises a plurality of continuously and repetitively connected, closed and non-equilateral hexagonal protruded ribs; the non-equilateral hexagonal protruded ribs has a shape circumferentially formed by two isometric and parallel positive short sides and two pairs of two parallel slanted long sides wherein the length of each positive short side is ranged from 4 mm to 8 mm, the length of each slanted long side is ranged from 5 mm to 9 mm, the length of the slanted long side is greater than that of the positive short side, and the positive short side and the slanted long side have same width of 1 mm and same height ranged from 0.25 mm to 0.35 mm.

* * * * *